Dec. 2, 1930.  H. L. BROWNBACK  1,783,698
CRANK PIN BEARING FOR CONNECTING ROD ASSEMBLIES
Filed Feb. 28, 1929
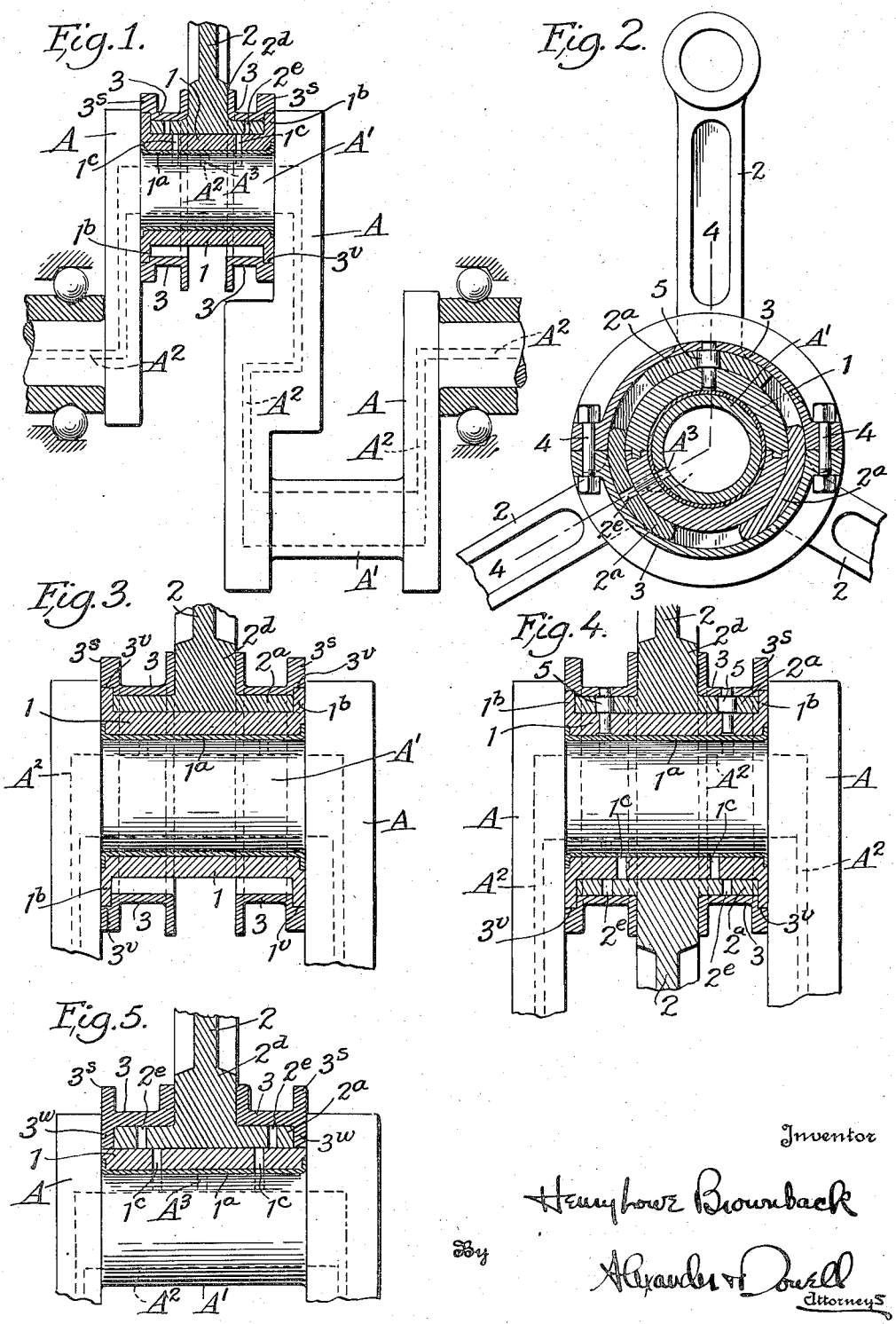

Patented Dec. 2, 1930

1,783,698

UNITED STATES PATENT OFFICE

HENRY LOWE BROWNBACK, OF NORRISTOWN, PENNSYLVANIA

CRANK-PIN BEARING FOR CONNECTING-ROD ASSEMBLIES

Application filed February 28, 1929. Serial No. 343,481.

This invention is a novel improvement in crank pin bearings for connecting rod assemblies in radial type internal combustion engines and the like, such as shown in my companion application filed September 26, 1928, Serial No. 308,472; the connecting rods for each crank being of any desired number and each rod having a slipper for engagement with a common divided bushing mounted so as to bear upon the crank pin; and the principal objects of the invention are to provide means for clamping the two halves of the crank pin bushing together so as to prevent the bushing from pounding upon the crank pin; also to provide an assembly which can be set up with a minimum of play or clearance, and having extensive lubricated surfaces to resist wear; to provide an assembly having a maximum of protection against oil leakage so as to provide proper lubrication throughout, the oil leaving the assembly in a spray condition so as to prevent flooding the engine cylinders with solid oil; and to provide a series of suitably placed oil ducts in the assembly to insure adequate pressure lubrication for every moving part or friction surface of the assembly.

Other minor objects of the invention will be hereinafter set forth.

I will explain the invention with reference to the accompanying drawing which illustrates several practical embodiments thereof to enable others familiar with the art to adopt and use the same; and will summarize in the claims the novel features of construction, and novel combinations of parts, for which protection is desired.

In said drawing:—

Fig. 1 is a view of a crank shaft showing in section one form of my novel crank pin bearing assembly applied to one crank thereof.

Fig. 2 is a transverse section through the assembly.

Fig. 3 is an enlarged longitudinal section through one form of the crank pin bearing assembly.

Fig. 4 is a section on the line 4—4, Fig. 2.

Fig. 5 is a section, similar to Fig. 3, but showing a modified form of the collar and bushing.

In said drawings, the crank arms A are provided with crank pins $A^1$ upon each of which is mounted a divided bushing 1, preferably babbitt lined as at 1a, and the bushing shown in Figs. 1-4 inclusive having outwardly extending flanges 1b at each end contacting with the adjacent cheeks of the crank arms A, said bushing 1 being adapted to bear on the crank pin $A^1$, and the halves of the bushing being clamped together, as hereinafter set forth, around the crank pin $A^1$ to prevent pounding.

Each connecting rod 2 (three being shown in Fig. 2) is provided with an arcuate slipper 2a formed to provide a bearing for the rod at a sufficient distance from the center of the rod 2 to prevent rocking of the rod 2 which might allow the outer ends of the slippers 2a to dig into or cant the surface of the bushing 1 and destroy same. Slippers 2a are adapted to float upon the outer periphery of bushing 1 between the flanges 1a (Figs. 1-4 inclusive) and are held in place by two divided collars 3, preferably of bronze and of U-shaped cross-section, which bear upon the outer faces of the slippers 2a. The ends of the halves of the collars 3 being clamped together by means of bolts 4 or the like passing through meeting flanges as shown in Fig. 2.

As shown in Figs. 1-4 inclusive the rod slippers 2a are of width to suit the spacing of the flanges 1b of bushing 1, and of curvature to suit that of the bearing 1 upon which the slippers bear. The arcuate length of the slippers 2a would of course depend upon the number of slippers to be used in connection with each crank pin $A^1$ (three being shown in Fig. 2). Where the number of connecting rods 2 on each crank pin $A^1$ is increased the arcuate length of the slippers 2a may be modified accordingly.

A pin 5 is preferably passed through one or each of the retaining collars 3 through one connecting rod slipper 2a and through bushing 1 (as shown in Figs. 2 and 4) so that the collars 3 and bushing 1 are locked to that slipper 2a its related rod 2 forming in effect a master rod. The remaining unfixed rods however rock freely between the well-lubricated surfaces of the bushing 1 and the retaining collars 3. The motion of the unfixed slippers 2a under the collars 3 and over the bearing 1 is however very slight. Preferably the pins 5 have an enlarged central portion adapted to fit in a correspondingly enlarged bore in the slipper 2a to prevent axial movement of the pin in the bore, while at the same time permitting ready assembling or disassembling of the master rod.

The collars 3 normally bear upon the slippers 2a between the shoulders 2d at the bases of rods 2 and the crank throw cheeks A. As shown in Figs. 1–4 inclusive the outer flange 3s of each collar 3 is somewhat thicker than the inner flange and in the outer lower edge of each collar is an annular recess 3v receiving the outer end of the flange 1b which extends beyond the outer face of the slippers 2a. The collars 3 overlap the flanges 1b, and when the halves of the collars are bolted together the collars will thereby tightly clamp the flanges 1b and will contract the halves of the bushing 1 together around the crank pin $A^1$. The flanges 1b engaging the recesses 3v however will maintain a fixed spaced relation for the purpose of maintaining proper clearance between the collars 3 and bushing 1 so that the slippers 2a of all the rods except the master rod are free to float and oscillate upon the bushing without binding. The edges of the oscillating slippers are preferably chamfered or rounded to evade cutting the oil film and to assist in spreading said film on the external surface of the bushing and internal surface of collars.

If desired the flanges 1b of bushing 1 could be omitted (as in Fig. 5) and a flange 3w formed on the outer edge of each U-shaped collar 3 opposite the outer flange 3s, the slippers 2a floating between the collar flanges 3w and the periphery of flanges 3w contacting with the cylindrical bushing 1, for the same purpose as the flanges 1b of the bushing 1. I prefer however the form shown in Figs. 1–4 inclusive.

The flanges 1b provide a large outer surface to offset wear and end play of the bearing 1, and provide bearings for the recessed portions 3v of collars 3 which hold the slippers 2a radially in place, and the flanges 1b also assist in holding the collars 3 axially in place by engaging the recesses 3v. The outer faces of the outer flanges of collars 3 may contact with the crank throw cheeks of the crank arms A.

Lubricating oil is forced by the usual oil pump (not shown) at high pressure through bore $A^2$ in the crank arms A and crank pins $A^1$, and through oil duct $A^3$ to the under side of the bearing 1. As the crank shaft revolves the oil spreads axially and circumferentially below bearing 1 and some of the oil passes through the radial oil holes 1c in the body of bearing 1, the rest of the oil spreading beyond the holes 1c and up along the surface of crank arms A exterior to the flanges 1a thereby thoroughly lubricating the entire contacting surfaces of the bearing 1 with respect to the pin $A^1$ and arms A. Also some oil passes outwardly through holes 1c into the space between the external surface of bearing 1 and the inner surface of slippers 2a and spreads axially and circumferentially over the outer face of bearing 1 and the flanges 1b thus thoroughly lubricating all contacting surfaces. A portion of the oil also passes through holes 2e in the rod slippers 2a to the under surfaces of the collars 3, and spreads axially and radially under collars 3 and into recesses 3v thereby lubricating the under surfaces of the collars 3 and also the faces of the shoulders 2d of rods 2 and the tops of flanges 1b. Hence all portions of the assembly will be thoroughly lubricated. Suitable annular oil grooves may be provided (not shown) on the under sides of the collars 3, slippers 2, and bearing 1 in the usual manner for assisting in spreading the oil circumferentially of said members.

The compression of the rod slippers insures adequate pressure lubrication of every moving part of the assembly through the oil ducts and holes in the assembled parts and the oil leaves the assembly in a sprayed condition thereby preventing flooding the engine cylinders with solid oil. The assembly can be set up with a minimum of play or clearance and has extensive lubricated surfaces to resist wear.

I do not limit my invention to the exact forms shown in the drawing for obviously changes may be made therein within the scope of the claims.

I claim:—

1. A crank pin bearing for the connecting rod slippers of radial type multi-cylinder engines, comprising a divided bushing adapted to float upon the crank pin; a pair of divided collars around the bushing adapted to confine the rod slippers between the bushing and collars, means extending entirely around the circumference for maintaining the collars in fixed spaced relation with respect to the bushing, means for locking the collars to the bushing; means for lubricating the members of the bearing through the bushing; and means on the collars for contracting the collars around the bushing and the bushing around the crank pin.

2. In a bearing as set forth in claim 1, said maintaining means comprising arcuate flanges on the halves of the collars engaging the bushing.

3. In a bearing as set forth in claim 1, said maintaining means comprising arcuate flanges on the halves of the bushing engaging recesses in the halves of the collars.

4. In combination, a crank pin; a crank pin bearing comprising bushing floating on said crank pin and having side flanges extending entirely around the circumference; radially disposed connecting rods having slippers floating on said bearing between the flanges, floating collars at the sides of the rods over the slippers and the flanges; means for locking one of the rod slippers and the collars to the bushing; means for lubricating the members of the bearing through the bushing; and means on the collars for clamping all the members of the bearing together; and the means for lubricating all the friction faces of the members consisting of non-registering perforations through the bushing and rod slippers.

5. In combination, a crank pin; a divided bushing floating on said crank pin and having annular flanges at its sides; radially disposed connecting rods having slippers floating on said bearing between the flanges, and divided floating collars at the sides of the rods around the slippers and overlapping the flanges; said flanges extending beyond the outer faces of the slippers, and said collars having annular recesses in the inner faces receiving the projecting portions of the flanges; one of the connecting rods forming a master rod; means for contracting the members together around the crank pin, and means for lubricating all the friction faces of the members through the bushing.

HENRY LOWE BROWNBACK.